INVENTORS
KENNETH V. KRATOCHVIL &
WALTER D. VOELKER
BY
Woodcock and Phelan
ATTORNEYS Sept. 20, 1955 K. V. KRATOCHVIL ET AL 2,718,576

PRECISION IMPEDANCES

Filed Feb. 7, 1951 4 Sheets-Sheet 2

INVENTORS.
KENNETH V. KRATOCHVIL &
WALTER D. VOELKER

BY Woodcock and Phelan
ATTORNEYS.

INVENTORS
KENNETH V. KRATOCHVIL &
WALTER D. VOELKER
BY
Woodcock and Phelan
ATTORNEYS Sept. 20, 1955 K. V. KRATOCHVIL ET AL 2,718,576

PRECISION IMPEDANCES

Filed Feb. 7, 1951 4 Sheets-Sheet 4

INVENTORS
KENNETH V. KRATOCHVIL &
BY WALTER D. VOELKER

Woodcock and Phelan
ATTORNEYS 2,718,576

PRECISION IMPEDANCES

Kenneth V. Kratochvil, Glenside, and Walter D. Voelker, Elkins Park, Pa., assignors to Leeds and Northrup Company, Philadelphia, Pa., a corporation of Pennsylvania Application February 7, 1951, Serial No. 209,832

18 Claims. (Cl. 201—63)

This invention relates to precision impedances and particularly to the manufacture of various types of precision resistors, including bifilar, unifilar, parallel-opposition and woven, used in electrical measuring, recording and control systems where initial and long-term accuracy is of prime importance.

Heretofore in manufacture of precision resistors individually adjusted to exact value, it has been a common practice to bind the resistor coil or webbing to a supporting form, leaving the ends of the resistance wire free for adjustment to the desired exact value of the resistor by end-trimming and resistance-measuring steps. The trimmed ends of the resistance wire and stiff mounting leads were subsequently bound to the form with the leads respectively adjacent the proper resistor wire ends, and while so held the wire ends and leads were joined by a brazing or soldering operation, followed when necessary by scraping, filing or other abrading of the resistance wire to reobtain the exact value of the resistor. The cost of these specified manual operations represents nearly the entire cost of individually adjusted precision resistors.

In accordance with the present invention, the tedious handicraft techniques previously used have been eliminated and precision resistors having an accuracy of the order of 0.01% and stability of the order of 0.001% per year are simply produced: further and more specifically the cost of individually adjusted precision impedances, and specifically resistors, is materially reduced by utilization of terminal members affixed to the ends of the supporting form and at least one of which provides for engagement with or anchoring of the corresponding end of the impedance or conductor at a selected point, peripherally of the form, which corresponds with the exact desired value of the resistor. For wire-wound or woven resistors, for example, the terminal members have an integral clamping device which firmly holds the end of the resistor wire to a shelf of the device which fixes the position of the solder puddle or equivalent electrical bond and so precisely determines the value of the resistor. More specifically, the terminal for one or both ends of the resistor form is a collar or cap which is dimensioned to have a press-fit with the form and is provided with an integral tab for anchoring or clamping an end of the resistor wire: for some uses, the terminal collar or cap may have an integral lead section for connection of the resistor to an external circuit. For multi-conductor resistors requiring two leads at one end of the resistor, one terminal at that end may be of the aforesaid collar type and a second terminal member extends through a passage from the face of that end of the form to a point on the periphery beyond the collar terminal, there to engage an end of the resistor wire.

Further in accordance with the invention, hermetically sealed precision impedances may be manufactured by providing the forms with metallic end-band coatings which can be bonded to the cap or collar terminals whose flanges in turn can be bonded to metallic band coatings internally of a sleeve which encases the resistor assembly. When the form is provided with a passage for a second terminal at one end, that passage may be hermetically sealed by bonding of a bushing for the terminal to a metallic band coating of the passage.

The invention further resides in features of construction, combination and arrangement hereinafter described and claimed.

For a more detailed understanding of the invention and for illustration of embodiments thereof, reference is made to the accompanying drawings in which.

Figures 1, 1A, 2, 3, 4, 5, 6, 7, 8, 9:
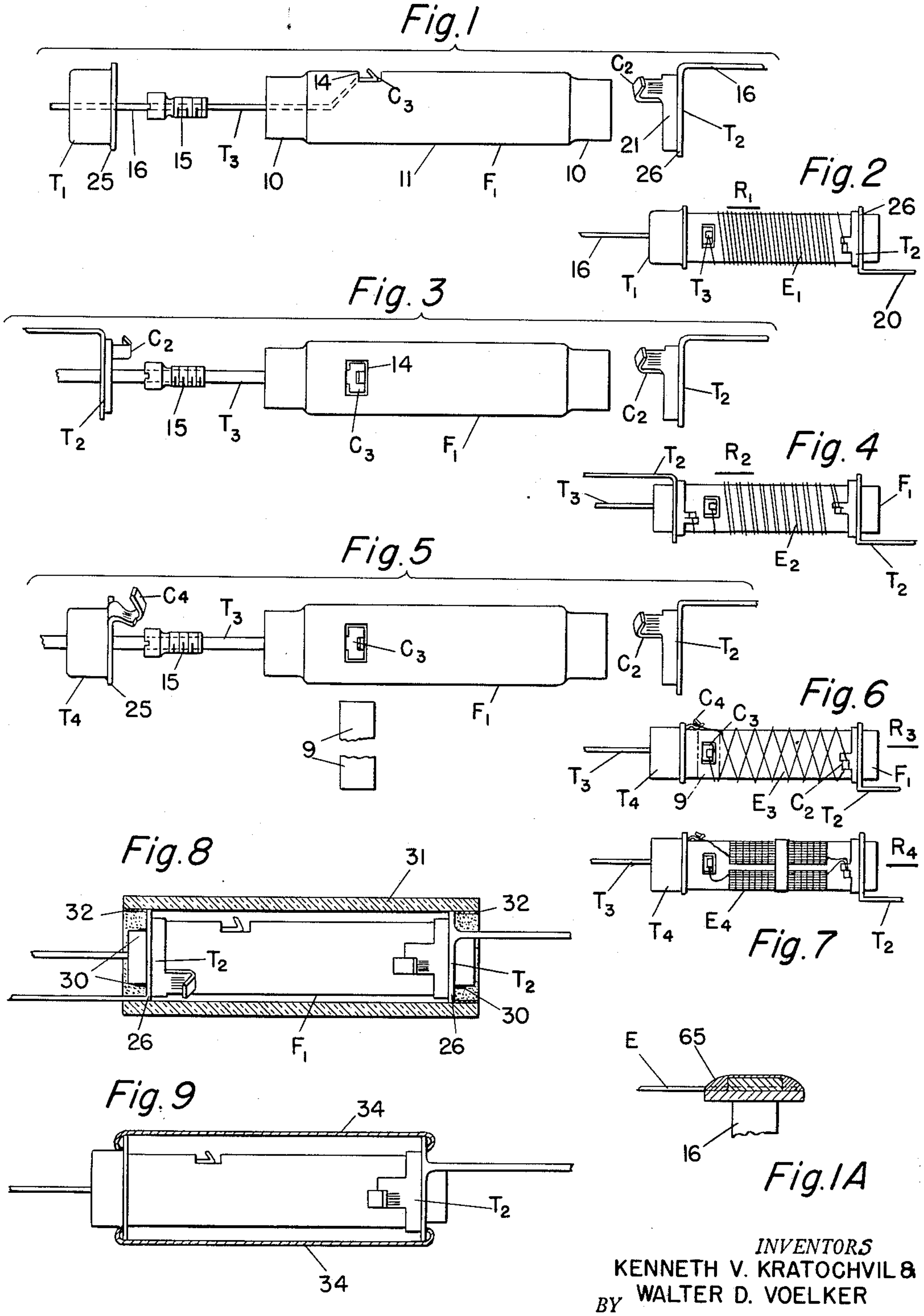
Figs. 1 and 2 represent a unifilar resistor in unassembled and assembled state.
Fig. 1A is an enlarged detail view referred to in discussion of the bonding of the resistor wire.
Figs. 3 and 4 represent a bifilar resistor in unassembled and assembled state.
Fig. 5 illustrates components which can be assembled to form the parallel-opposition resistor of Fig. 6 or the woven resistor of Fig. 7.
Fig. 8 is a cut-away view of a hermetically sealed precision resistor.
Fig. 9 is a sectional view of a precision resistor encased for protection against mechanical injury.
Figure 10:
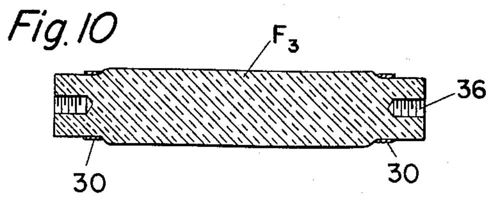
Figs. 10, 11 and 12 are cross sectional views of winding forms.
Figure 14:
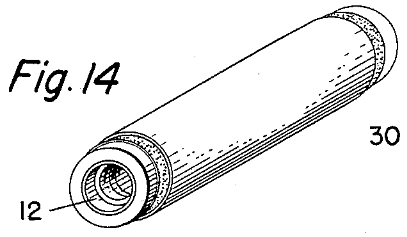
Fig. 14 is a perspective view of the form shown in Fig. 12.

Referring to Fig. 1, there are shown components selected from Figs. 10 to 25 for fabrication of the precision unifilar resistor $R_1$ shown in Fig. 2. The resistor form $F_1$ for supporting the unifilar winding $E_1$ is of hard insulating material, preferably a ceramic material such as glass, fired lava, steatite or the like. The intermediate section 11 is preferably accurately dimensioned as by centerless grinding. The end sections 10 of the form are of diameter preferably slightly smaller than the diameter of the intermediate winding section 11 and are dimensioned freely to receive terminal members $T_1$ and $T_2$ later described in detail, which are pressed onto the ends of section 11. By so relieving each end of the form as at 10 of Fig. 1, the pressing of a terminal onto the form does not leave a track of metal from the terminal in its final position to the end of the form, which track would provide a leakage path.

Figure 15:
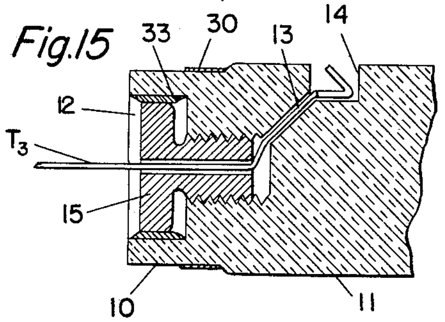
Fig. 15 is a fragmentary view, in section and on enlarged scale, of a terminal clamping arrangement.

As more clearly shown in Figs. 12 to 15, the face of one end of the form $F_1$ is provided with a recess 12 connecting with a passage 13 which extends transversely of the body of the form to an opening or slot 14 in its periphery. A third terminal member $T_3$, later specifically described, extends through the passage 13 and is clamped to the form by bushing 15, which as shown in Fig. 15, engages the recess 12: in this particular exemplary embodiment the bushing and recess are complementarily threaded.

Figures 16, 26:
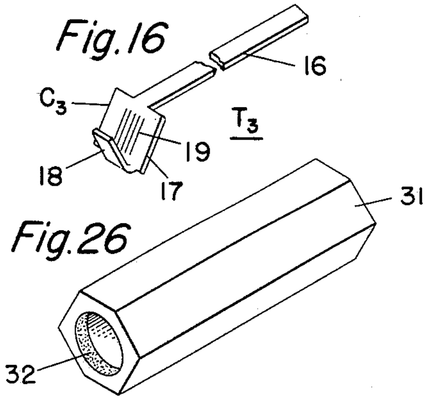
Figs. 26 and 27 are respectively perspective and sectional views of the resistor casing shown in Fig. 8.

As best shown in Fig. 16, the terminal member $T_3$ has an elongated narrow lead section 16 with a clamping device $C_3$ at one end. The clamping device is provided by a short, wide section 17 and a narrow tab 18 extending therefrom at the region opposite the clamping area 19, which is preferably knurled, of section 17. The shelf area of section 17 on one or both sides of the clamping area provides, as later described, that the electrical bond to the resistor wire wound on the form is at a length corresponding with the exact value desired. As above indicated, and as preferred, the lead and clamping device may be integrally formed with terminal $T_3$ from thin sheet metal, as by a stamping or punching operation. Reverting to Fig. 1, in assembling the components the lead section of terminal $T_3$ is slipped through the passage and recess of the form to bring the clamping device $C_3$ within the peripheral notch 14 of the form. This terminal $T_3$ is then clamped in position to form $F_1$ by slipping the bushing 15 over the lead and tightly into the form recess 12.

An end of the resistor wire to be used in making the resistor element $E_1$ is then bared, if insulated, and held to the form by passing it between the tab 18 and knurled section 19 of the terminal $T_3$ and then pressing down the tab or by winding the free end around the tab. Preferably, the anchored end of the resistor wire is then soldered to the clamping device as later described.

The resistor wire is wound, as by mechanism later described, on the winding section 11 of the form. The length of wire necessary to afford the exact desired value of the resistor is ascertained, preferably as later described, so to determine the point peripherally of the winding form at which the resistance wire should be engaged by the clamping device $C_2$ of the terminal member $T_2$. The second terminal $T_2$ is then pressed onto the opposite end of the form with its clamping device $C_2$ at the precise angular position for engagement with the end of the predetermined length of resistor conductor.

Figure 17:
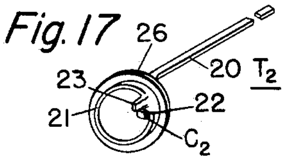
Figs. 16 to 21 are perspective views of various terminal members.

The terminal $T_2$ as best shown in Fig. 17 is a stamping or punching of thin metal having a long narrow lead section 20; a collar section 21 and a clamping device $C_2$ provided by tab 22 and wider section or shelf 23. The tab and collar may alternatively be one element and the flange and lead a second element preferably attached to the first after assembly on the form and with the first element in its proper angular position. With the terminal $T_2$ pressed on the form in proper angularly adjusted position, the end of the resistor winding is anchored by pressing the tab 22 of the clamping device toward the knurled section of 23 or by winding it around the tab. The resistor winding is thus mechanically anchored to the form independently of any heating in subsequent steps of fabrication or use of the resistor which is also true of the other terminals $T_1$ and $T_3$ without need for any binding. The ends of the resistor wire and the leads are also held to the form without binding threads and the soldering or brazing or other bonding of the ends of the resistor wire to the terminals brings the electrical junction to the exact and predetermined value of the resistor. As in the case of clamping device $C_3$, the section 23 of clamp $C_2$ definitely fixes the point at which the solder puddle or equivalent bond makes electrical contact with the resistor wire. Preferably the solder is applied to wet the entire tab forming a dome of solder which, with the resistor wire on the shelf, precisely locates the electrical junction to the resistor wire as in Fig. 1A. For clarity, the solder dome 65 has been omitted in figures other than Fig. 1A.

The lead extensions of the terminals $T_2$ can be sufficiently rigid to permit mounting of the resistor supported only by the leads and in the case of the bifilar resistor the right-hand terminal $T_2$ may serve this purpose solely as it normally is not connected to an external circuit: if not used for mounting purposes, this external lead section 20 may be clipped off or omitted.

Figure 22:
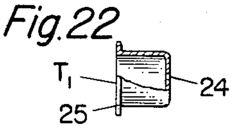
Figs. 22 to 25 are side elevational views, partly broken away, of terminal members.
Figure 19:
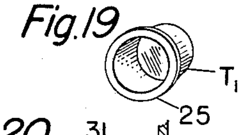
Figure 23:
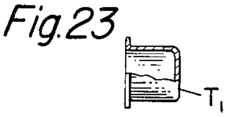

Preferably, and particularly when the resistor $R_1$ is to be hermetically sealed, the terminal member $T_1$ is pressed on the corresponding end of the form, usually before winding of the resistor wire thereon. The terminal member $T_1$, as best shown in Figs. 19 and 22, is cap or cup-shaped with a small slot or hole 24 permitting passage of the lead section 16 of terminal member $T_3$ and with a flange 25 of diameter corresponding with that of flange 26 of the collar section of terminal $T_2$.

Figure 11:
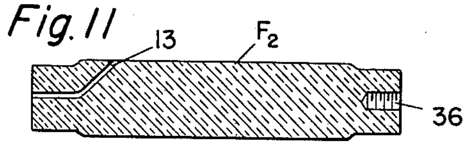
Figure 12:
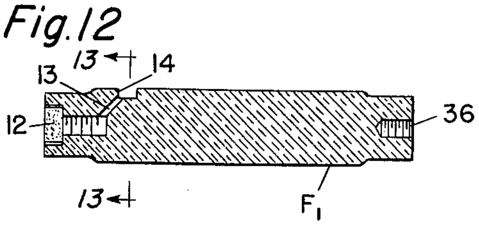
Figure 13:
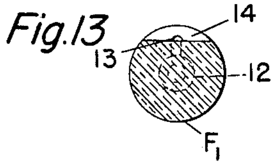
Fig. 13 is a sectional view taken on the line 13—13 of Fig. 12.

Since in unifilar resistors, such as shown in Fig. 2, there is no need for protection of a second conductor from engagement with the terminal $T_3$, the recess or slot 14 for insuring that the clamping device of terminal $T_3$ shall be below the periphery of the form is unnecessary and therefore the unifilar resistor of Fig. 2 may be wound upon the somewhat simpler form $F_2$ of Fig. 11, in which the passage 13 extends directly to the periphery of the form without notching. In other respects the form $F_2$ of Fig. 11 is generally similar to that of Fig. 12 and need not further be described: if used for a hermetically sealed resistor, the end face of the form or the face end of the passage is provided with a metallic coating for bonding to terminal $T_3$. Other ways of securing terminal $T_3$ in position on form $F_2$ include deforming the lead section 16 as it emerges from the form end, by applying solder or adhesive at the point of emergence, or by other suitable methods.

To manufacture bifilar resistors $R_2$ such as shown in Fig. 4, there may be employed the same components as in Fig. 1 except that the cap terminal $T_1$ of Fig. 1 is replaced by a second terminal member $T_2$ of the collar type. As all components of Fig. 3 have been previously described, repeated description of their construction is here unnecessary.

To make a bifilar resistor from these components, terminal $T_3$ is clamped to the form, as described in connection with Fig. 1, and the collar terminal $T_2$ for the same end of the form is pressed into place with its clamping device $C_2$ in proximity to the clamping device $C_3$ of terminal $T_3$. The ends of two resistance wires are then held to the form as by pressing down the tabs 18, 22 of these two clamping devices and soldering. The two conductors are then wound side-by-side on the winding section 11 of the form: If flat conductors are used, they may be wound one over the other. After the proper angular position for the terminal $T_2$ at the other end of the form is determined, as above described, the second terminal $T_2$ is pressed onto the form in the proper position to bring its clamping device $C_2$ at the point where the dual winding is to terminate. The bared ends of both resistor conductors of resistor element $R_2$ are then clamped to the second terminal $T_2$, as by pressing down of its tab 22, and soldering.

Alternatively, the common ends of the two wires or single looped wire may first be clamped and soldered to the right-hand terminal $T_2$, Fig. 4, the wire or wires wound on the form and the two free ends individually clamped and soldered respectively to the terminals $T_3$ and $T_2$ at the left-hand end of the form.

To manufacture parallel-opposition resistors $R_3$, such as shown in Fig. 6, there may be employed the components shown in Fig. 5 which are the same as those of Fig. 1 except that the cap terminal $T_1$ of Fig. 1 is replaced by a cap terminal member $T_4$ having an integral clamping device $C_4$. As shown most clearly in Fig. 18, the cap terminal $T_4$, like cap terminal $T_1$, is provided with a small opening 24 in the bottom for passage of the lead section 16 of terminal $T_3$ and with a flange 25. The clamping device $C_4$, like those of the other terminal members described, has a tab 27 which can be pressed or bent against a knurled section 28 to clamp the end of the resistance wire.

In manufacture of parallel-opposition resistors, one end of resistor wire is held to the form by the clamp $C_3$ of terminal $T_3$. A thin strip 9 of insulating material is preferably wound on the form with the initial turns of the conductor to overlie the clamp $C_3$ in the notch 14 so to provide a smooth continuous surface for the second layer or winding. The proper length of conductor for this half of the winding is determined as above described and connection made at the proper point by positioning of the clamp $C_2$ of right-hand terminal $T_2$. The form $F_1$ is then rotated in the same direction to wind on the second layer of resistance wire, and the proper length of this layer determined as above described before the left-hand cap terminal $T_4$ is pressed onto the form in the proper angular position to bring its clamp $C_4$ at the point at which the second winding terminates. The resistor element $E_3$ thus formed is attached to form $F_1$ and terminals added without use of binding windings. The cap $T_4$ is soldered to strip terminal $T_3$ at the point where the lead section 16 of terminal $T_3$ passes through the hole 24 of cap $T_4$.

The components of Fig. 5 may also be used for woven resistor assemblies $R_4$ such as shown in Fig. 7. In this case, the resistor element ($E_4$) is not wound spirally on the form but is prewoven as a web as shown for example in U. S. Patents Nos. 1,972,499, 1,972,720 and 2,199,810. In such case, the resistor element is held to the form by suitable binding and the proper ends of the multi-conductor resistor element connected to the terminals $T_2$, $T_3$ and $T_4$. The proper length of the free ends of the resistance conductor is preferably determined before mounting of the webbing so that the terminals $T_2$, $T_4$ may be pressed onto the ends of form $F_1$ in proper angular position to minimize slack in the wire ends of the weave.

Figure 25:
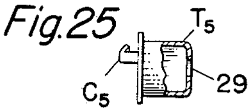

It should be apparent from the foregoing description that various terminal and form combinations, such as shown in Figs. 3 and 5, may be interchangeably used for bifilar, parallel-opposition or woven resistors. These and other terminal and form combinations herein disclosed which provide two terminals at each end may also be used for impedance elements, using two separate conductors such as the conductors of an open-ended transmission line, pulse-delay network or a small capacitor. For bifilar resistors, woven resistors and the like requiring two terminals at one end to be electrically insulated, as connected to an external circuit, the cap terminal $T_4$ may be replaced by the cap terminal $T_5$ of Fig. 25 provided with a bottom opening 29 sufficiently large to pass both the lead section 16 of terminal $T_3$ and, if required, a short section of insulating tubing (not shown), preventing contact between the terminals $T_3$ and $T_5$.

Figure 27:
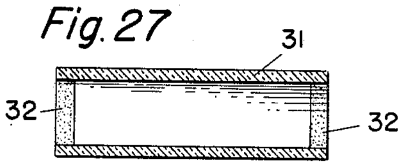
Figure 18:
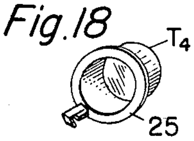

When hermetically sealed resistors are to be made, the relieved ends 10 of the winding form are banded, as best shown in Fig. 15, by a thin metallic coating 30, which may be applied by firing. This band is adjacent the final position of the terminal and terminates short of the end of the form when the terminal must be insulated from the mounting or another terminal at that end. After the end terminals, whether of the collar or cap type, are pressed onto the ends of the form, they are bonded to the bands 30. A casing 31, such as shown in Figs. 8, 26 and 27, banded at its opposite ends by metallic coatings 32, which as shown may be internally of the bore, or which alternately may be on the end faces, is slipped over the assembled resistor with the flanges of the end terminal members respectively in proximity to the metallic bands 32. Specifically in the particular arrangement shown in Fig. 8, the flanges 26, 26 of the collar type terminals $T_2$, $T_2$ are surrounded by the metal bands 32, 32 of the housing 31. A hermetic seal between the bands 30 and the form and between the bands 32 and the terminals may be effected by solder or the like.

When the resistor to be hermetically sealed is of the typing using a center lead $T_3$, such as shown in Fig. 15, the recess 12 at the corresponding end of the form is banded by a metallic coating 33 on the face or recess which is bonded by a soldering operation or equivalent to the clamping screw 15 of the center terminal $T_3$. All paths from ambient atmosphere to the space or chamber containing the resistor elements and its connections to the terminals are thus sealed off, preventing damage to or deterioration of the resistor by moisture or corrosive gases. A hermetic seal satisfactory for many purposes may be obtained by omitting the metallic bands and sealing the terminals to the casing and to the form by a suitable filler, cement or adhesive such as a glycol resin.

When it is not necessary to protect the resistor element by hermetic sealing but it is nevertheless desired to avoid mechanical injury thereto, the resistor assembly may be covered as by a housing of insulating material supported or spaced by the terminal flanges. Specifically, in the modification shown in Fig. 9, a thin cylinder 34 of deformable insulating material such as cellulose acetate is slipped over the resistor assembly, the diameter of the terminal flanges closely approximating the internal diameter of the casing 34. The ends of the tube or casing 34 are then turned inwardly and backwardly as by a spinning operation to engage the external faces of the terminal flanges. A coating of adhesive cement may be applied at the interfaces as a seal.

When the resistor is not encased, the flanges of the terminal members being of greater diameter than the combined diameter of the form and conductor thereon serve to protect the conductor in manufacture and use of the resistor.

Figures 28, 29, 30, 35:
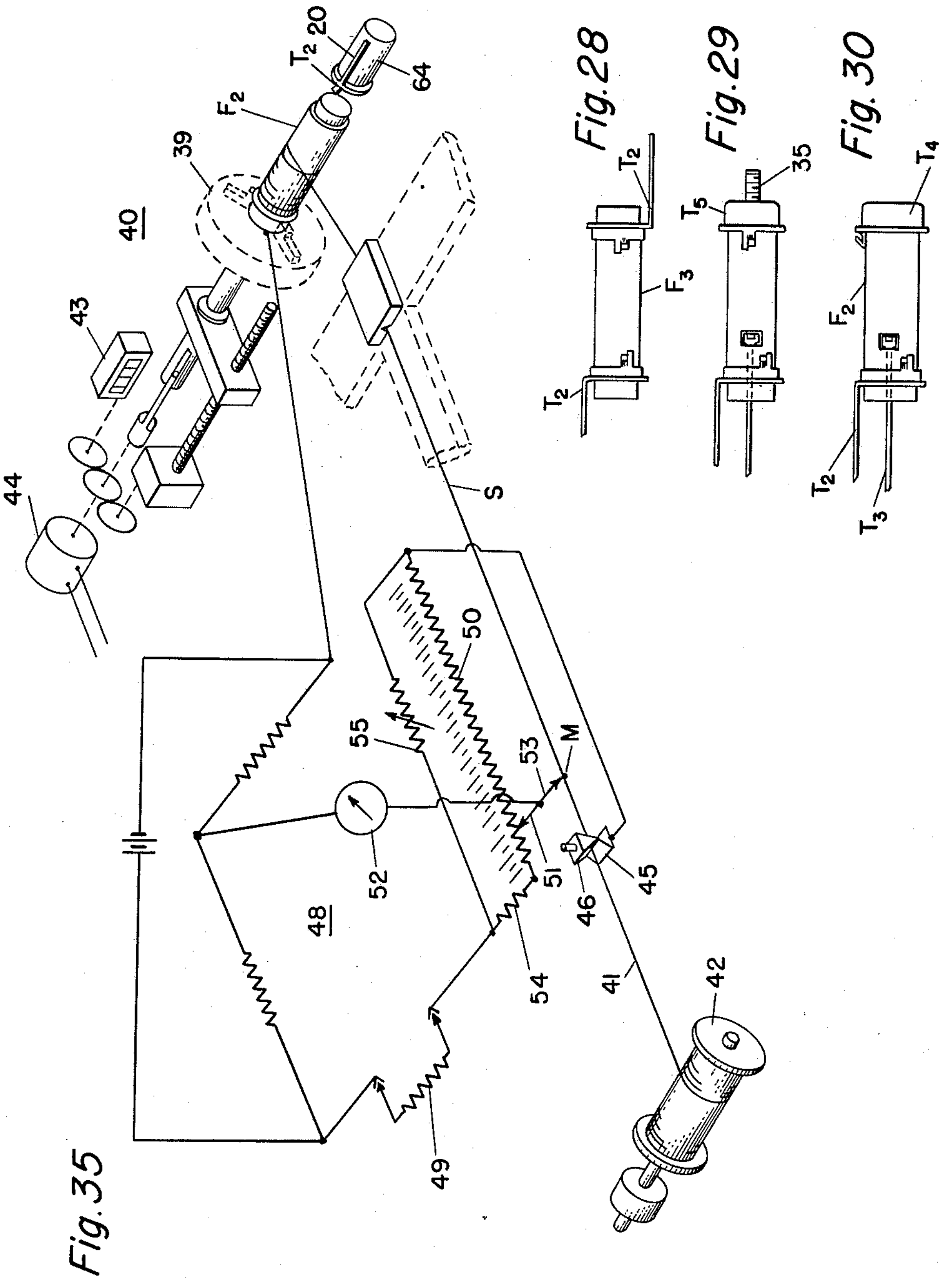
Figs. 28 to 30 illustrate other resistor assemblies using components shown in Figs. 10 to 25.
Fig. 35 illustrates an arrangement for winding precision resistors and for precisely predetermining the length of wire for a resistor winding.

Although but four specifically different combinations of components have thus far been specifically described for manufacture of certain types of resistors, it should be evident to those skilled in the art that a wide variety of terminal combinations suited for different types of impedances can be selected from the relatively few components shown in Figs. 10 to 25. By selection of proper terminal members and forms, there can be accommodated the need to have one, two or more connections to the resistor conductor at either or both ends and to have one or two leads at either or both ends for external connection. For example, as shown in Fig. 28, a form-terminal combination suitable for winding of a unifilar resistor comprises the form $F_3$ of Fig. 10 and two collar type terminals $T_2$ of Fig. 17. A component assembly suitable for bifilar, parallel-opposition or woven resistors may, as shown in Fig. 30, be comprised of the form $F_1$ (Fig. 12), or form $F_2$ (Fig. 11), a collar terminal $T_2$ (Fig. 17), a center terminal $T_3$ (Fig. 16) and a cap terminal $T_4$ (Fig. 18): alternatively, the cap terminal $T_5$ may be of the type shown in Fig. 24 having a mounting stud 35. For mounting purposes, when a cap terminal $T_5$ or equivalent is not used, the corresponding ends of the forms $F_1$, $F_2$, $F_3$ may be provided with a threaded opening 36 in the corresponding end face for receiving a mounting screw or stud.

Figure 20:
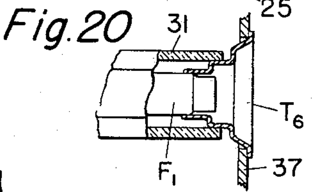
Figure 24:
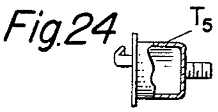
Figure 21:
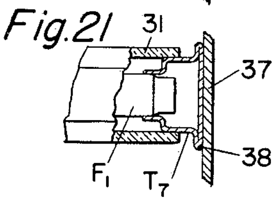

In Figs. 20 and 21, the terminals $T_6$, $T_7$ are of construction to facilitate mounting of the impedance and may additionally be used as electrical connections. The terminal $T_6$ of Fig. 20 may be forced into the hole of a panel 37 with the base flange abutting a face of the panel. The base of terminal $T_7$ of Fig. 21 may be secured to a panel 37 by clamping, soldering or otherwise bonding to the flange 38. These various terminal arrangements for anchoring at a precisely selected point are superior to the practice, for example, of soldering a resistor conductor to a plain ring or flange which has the disadvantages that the electrical junction is indefinite because of small angle of incidence and is mechanically weak and unprotected.

Figure 31:
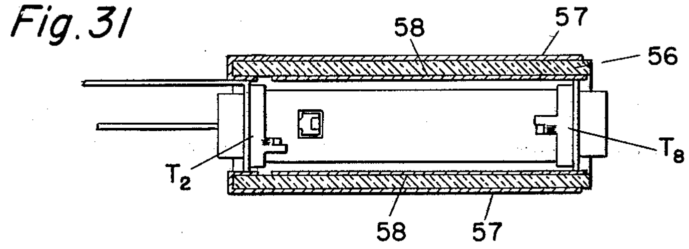
Figs. 31 to 34 are assemblies providing for shielding or balancing of the impedance winding.
Figure 32:
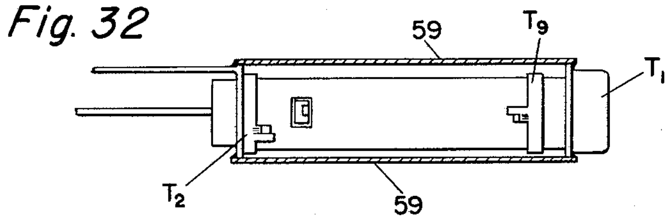

The casing for protection or hermetic sealing of the resistor may also serve as an electrostatic shield. When the casing is of insulating material, the inner or outer surface, or both, may be metallized: specifically the casing 56 of Fig. 31 is provided with an external coating 57 which extends over one end face for bonding to a cap or collar terminal $T_2$ and extends externally of the casing nearly to the opposite end, and in any event overlying the impedance winding. For double shielding, the casing may also be provided with an internal metallized coating 58 for bonding to the terminal $T_8$. The internal coating overlies the impedance winding and terminates short of terminal $T_2$. By selection or adjustment of the lengths of the coatings, the thickness and the material of the casing, the electrical capacitance between the coatings may be chosen or adjusted to offset the residual inductance of a resistor, to tune an inductive type of impedance or to meet other circuit requirements. When the casing, such as casing 59, Fig. 32, is of conductive material, it may be bonded to the flanged terminal members $T_1$, $T_2$, the former insulated from the impedance winding: the right-hand end of the impedance windings is in this case anchored to an unflanged collar terminal $T_9$. Alternatively, the casing and an integral sleeve or cap for fitting the right-hand end of the form may be used.

Figure 33:
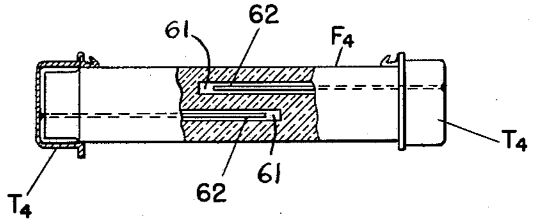
Figure 34:
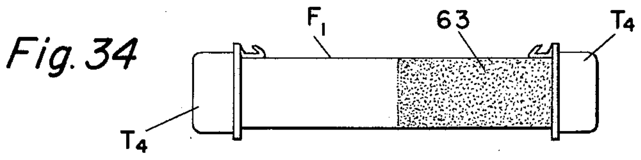

The residual inductance of a resistor may be balanced out by capacitor elements which are within the form instead of being physically a part of a housing as in Fig. 31. Specifically, in Fig. 33, the form $F_4$ has recesses or holes 61 extending from opposite ends to receive the capacitor elements 62 which to adjusted extent extend into the holes 61 and as adjusted are soldered or similarly electrically connected to the terminals. Higher capacitance values are more easily obtainable, as in Fig. 34, by applying to the winding section of the form a metallized coating 63 which is bonded to one of the terminals such as a cap terminal $T_4$. When the winding is wound over the coating, it effectively increases the distributed capacitance. Various values of effective capacitance of the impedance may be obtained by selection of the area and shape of the coating.

The wire often employed in resistors and inductors is insulated with enamel, silk or cotton, or combination of them. In order to take full advantage of the new assemblies, it is desirable to easily predetermine the exact length of wire which will afford the desired value of the finished impedance. This eliminates labor of numerous cleaning and cutting operations and avoids consequent damage to the conductor and insulation which would impair the electrical qualities of the resistor. Further, it is not necessary to cut or frequently bare the wire as it comes from a supply spool which is particularly of advantage in the handling of the almost invisible wire commonly used in high value resistors.

A preferred way of effecting that determination is shown in Fig. 35. For simplicity of explanation, it will be assumed that a unifilar resistor is to be made. The winding form after affixing thereto of a suitable terminal is held by the chuck 39 of a winding mechanism 40. An end of the resistance wire 41 from supply spool 42 is mechanically clamped and electrically connected to the terminal member as above described. The resistance wire is wound upon the form until the length of the wire, as indicated by the revolution counter 43 coupled to the chuck 39 or its driving motor 44, between its clamped end on the form and fixed measuring point 45 is slightly in excess, for example, 3% to 5%, of the length required for the exact desired value of the resistor. The winding of the resistor is then temporarily interrupted and contact made to the wire at the measuring point by a pair of relatively movable jaws 45, 46. The jaws may be of type suited to pierce the insulation or the wire may be bared prior to movement into engagement therewith of the jaws. The uncut length of resistance wire in part wound upon the resistor form is thus included in any suitable measuring circuit; specifically in the arrangement shown, it is connected in an arm of a bridge network 48. An adjacent arm of the bridge includes a standard resistor 49 corresponding with the desired value of the resistor to be wound on the form. In these two arms of the bridge between the standard resistor 49 and the incompleted resistor is interposed a slidewire 50 having a movable contact 51 adjustable to balance the bridge indicated as by a null deflection of galvanometer 52 or equivalent. To the slidewire contact 51 is mechanically coupled an indicator movable from the measuring point 45 along the resistance wire towards the resistor form. The relation between the resistance of wire 41 per unit of length to the incremental change of resistance effected by movement of slidewire contact 51 is such that the bridge 48 is in balance when the indicator 53 is opposite the point M which should be attached to the other end terminal of the resistor to provide the exact desired value. When the point M arrives at a point S whose distance from the form corresponds with a known number of degrees of rotation of the form, the end terminal, $T_2$ for example, is pressed onto the form with a fixed orientation which provides that the clamping device will be in position to meet the point M of the wire. Other techniques for mounting the terminal $T_2$ after the point M has been determined may be used. In Fig. 35, the terminals $T_2$ are received by a plunger 64 having a recessed face to receive the collar of the terminal and the end of the winding form: a slot on the periphery of the plunger receives the lead 20 of the terminal to orient it with its clamping device in proper angular position to meet point M of the finished winding. Other methods of orientation may be used.

In the particular bridge network shown, the bridge is an equal ratio arm bridge, the standard resistor 49 is of value equal to the desired value of the finished resistor, and an end coil 54 of resistance value equal to that of slidewire 50 is connected between it and the standard resistor. The slidewire and end coil 54 are shunted by a resistor 55 adjusted so that when contact 51 is moved, the effective change in resistance of the shunted slidewire per unit length of the slidewire is one-half that of the resistance wire 41 of the same length. As resistance is transferred from one lower arm of the bridge to the other by adjustment of contact 51, the effect is the same as if the contact 51 remained at the zero of the slidewire and a length of the unfinished resistor wire were cut out of the circuit. Accordingly, the position of the indicator 53 shows the point M on the resistor wire which should be the end of the resistor being wound. When this point, which can be marked for that purpose, is wound about the periphery of the form, it indicates the angular position at which the collar or cap terminal should be pressed on the form to anchor the corresponding end of the resistor wire.

For brevity in the specification and claims, the term "soldering" shall be understood to include brazing, welding or other bonding operation; the term "wire" shall be understood to cover metallic or non-metallic conductor of flat, circular or other cross section; and multi-conductor winding shall include insulated windings in which the conductors are wound side-by-side or one over the other concurrently or in sequence.

What is claimed is:

1. A precision impedance comprising a form of insulating material for supporting conductor intermediate the ends of the form, and terminal members attached to the form and respectively attached to opposite ends of the conductor, at least one of said terminal members having a single, short integral tab with an edge substantially at right angles to the conductor extending across it from said form, said one of said terminals prior to its attachment to said form being rotatable about the axis of said form to effect engagement between said edge of the tab and said conductor precisely at a point of said conductor previously determined as affording the exact desired impedance value.

2. A precision impedance as in claim 1 in which said one of the terminal members is a collar dimensioned tightly to fit the corresponding end of the form, said collar being angularly adjustable while loose to position the tab peripherally of the form to bring said edge of the tab into engagement with the conductor extending at right angles thereto from the form at a point of said conductor previously determined as affording the exact desired impedance value.

3. A precision impedance as in claim 1 in which said one of the terminal members is a cap dimensioned tightly to fit the corresponding end of the form, said cap being angularly adjustable while loose to position the tab peripherally of the form to bring said edge of the tab into engagement with the corresponding end of said conductor, as extending from the form substantially at right angles to said edge, at the point of said conductor previously determined as affording the exact desired impedance value.

4. A precision impedance as in claim 1 in which the form has a passage extending from one end face to a fixed point on the form-periphery spaced from said end face and in which another one of said terminal members extends through said passage to engage another end of the conductor, and in which a bushing entering said passage through said end face clamps the last-named terminal member.

5. A precision impedance as in claim 4 in which the terminal member at the other end of the conductor is an encircling member dimensioned tightly to fit the corresponding end of the form, said last-named terminal member having a single, short integral tab with an edge substantially at right angles to the conductor extending across it from said form, said last-named terminal member prior to its attachment to said form being rotatable about the axis of said form to effect engagement between said edge and said conductor precisely at a predetermined point of the conductor affording the exact desired impedance value.

6. A precision impedance comprising a form of insulating material for supporting a multi-conductor impedance element intermediate the ends of the form, said form at one end having a passage extending from the end face to a fixed point on the form-periphery spaced from said end face, a terminal member extending through said passage to anchor at said fixed point an end of one of the resistor conductors, a terminal member encircling and tightly fitting said one end of the form and having an integral tab for anchoring an end of another resistor conductor, and a third terminal member encircling and tightly fitting the opposite end of said form and having an integral tab for anchoring the other ends of said resistor conductors, at a point positioned angularly with respect to said fixed point by rotation of at least one of the second and third terminal members while loose.

7. A hermetically sealed impedance comprising a ceramic winding form for supporting conductor disposed intermediate the ends of the winding form, metallic coating bands completely encircling the ends of the winding form beyond the conductor, flanged terminal members respectively encircling opposite ends of said winding form and there hermetically bonded to the corresponding bands, said terminal members being electrically connected to opposite ends of the conductor, and a tubular casing of insulating material for encasing said winding form and said terminal members and having at opposite ends internal metal-coating bands respectively hermetically bonded to the flanges of said terminal members.

8. A hermetically sealed resistor comprising a ceramic winding form for supporting a multi-conductor resistor element intermediate the ends of the form, said form having a receess in the face of one end with a passage extending from the recess to a point on the periphery of the form spaced from said one end, metallic coating bands encircling the ends of the form beyond the resistor element, flanged terminal members respectively encircling opposite ends of said form and there hermetically bonded to the corresponding bands, a central terminal member extending through said recess and passage, said three terminal members providing connections to the multi-conductor resistor element, a metallic coating in the recess of said form, a bushing tightly fitting said recess to clamp the central terminal member and hermetically bonded to the recess coating, and a tubular casing of insulating material for encasing said winding form and said flanged terminal members and having at opposite ends internal metal-coating bands respectively hermetically bonded to the flanges of the flanged terminal members.

9. A shielded precision impedance comprising an insulating form for supporting impedance conductor intermediate ends of the form, radially flanged terminal members encircling opposite ends of the form and at least one of which is electrically connected to said conductor, a preformed housing supported by flanges of said terminal members in spaced relation from said conductor and at least in part comprising an electrostatic shield connected to at least one of said terminals.

10. A shielded impedance as in claim 9 in which the housing is of insulating material and in which a conductive coating thereon provides the electrostatic shield.

11. A shielded impedance as in claim 10 in which two conductive coatings on the internal and external surfaces of the casing and insulated from each other for electrical connections providing double shielding.

12. A shielded impedance as in claim 9 in which the housing is of metal itself to form an electrostatic shield.

13. An impedance terminal element for a wire-wound or woven precision impedance comprising an elongated lead section of thin narrow strip conductor having at one end an integral wire clamping device consisting of a short, wide extension of the lead section having a clamping area and a contiguous shelf area with a free edge between said clamping area and said impedance, a narrow tab extending from said clamping area for bending toward said clamping area to hold the end of impedance wire extending beyond said shelf area, said shelf area being provided for soldering of the wire to said terminal element with precise location of the electrical junction at said free edge of the shelf area.

14. A terminal element as in claim 13 which in addition includes an integral short tubular section intermediate the lead section and clamping device, said tubular section being of internal dimension tightly to fit an end of a supporting form for the impedance wire.

15. A terminal element for a precision impedance supported on a form comprising a section for holding said element to the form, and a clamping and soldering device integral with said holding section and consisting of a wide section having a clamping area and a contiguous shelf area with a free edge between said clamping area and said impedance, and a narrow tab section integral with said device and bendable toward said clamping area to hold the end of impedance wire extending beyond said shelf area, said shelf area being provided for soldering of the wire to said terminal element with precise location of the electrical junction at the free edge of the shelf area.

16. A terminal element as in claim 15 in which the form-holding section of said element is a tubular section of internal dimension tightly to fit an end of the impedance-supporting form in any angular position.

17. A precision impedance comprising a form of insulating material for supporting conductor intermediate the ends of the form, and terminal members attached to the form and respectively attached to opposite ends of the conductor, at least one of said terminal members having an integral clamping and soldering device consisting of a wide section having a clamping area and a contiguous shelf area with a free edge between said clamping area and the conductor on said form, and a narrow tab section integral with said device and bendable toward said clamping area to hold the end of said conductor extending at right angles across said free edge and beyond said shelf area, said shelf area being provided for soldering of the conductor to said terminal member at the free edge of said shelf area, said terminal member being rotatable about the axis of said form prior to its attachment thereto to effect engagement between said free edge and said end of the conductor precisely at a predetermined point affording the exact desired impedance value.

18. A precision impedance comprising a form of insulating material having at least one end section which is of diameter somewhat less than the intermediate section which supports the impedance conductor, and terminal members attached to said form and to opposite ends of said conductor, at least one of said terminal members having a tubular section for loosely fitting said end section for rotation about the axis of said form and tightly fitting said intermediate section, said terminal member having a short, integral tab with a free edge at right angles to the conductor extending thereacross from said form for engagement therewith, by rotation of said terminal member on said end section, precisely at a predetermined point affording the exact desired impedance value.

References Cited in the file of this patent

UNITED STATES PATENTS

| | | |
|---|---|---|
| 1,208,756 | De Khotinsky | Dec. 19, 1916 |
| 1,642,223 | Boker | Sept. 13, 1927 |
| 1,830,084 | Bjorndal | Nov. 3, 1931 |
| 1,910,866 | Van Nostrand | May 23, 1933 |
| 1,977,697 | Rockwood | Oct. 23, 1934 |
| 2,111,220 | Megow | Mar. 15, 1938 |
| 2,332,255 | Podolsky | Oct. 19, 1943 |
| 2,401,954 | Newton | June 11, 1946 |
| 2,518,225 | Dorst | Aug. 8, 1950 |
| 2,524,550 | Thom | Oct. 3, 1950 |
| 2,537,061 | Kohring | Jan. 9, 1951 |
| 2,558,798 | Thom | July 3, 1951 |

FOREIGN PATENTS

| | | |
|---|---|---|
| 610,800 | Great Britain | Oct. 20, 1948 |